US008060231B2

(12) United States Patent
Winkler

(10) Patent No.: US 8,060,231 B2
(45) Date of Patent: Nov. 15, 2011

(54) PRODUCING A LOCALLY OPTIMAL PATH THROUGH A LATTICE BY OVERLAPPING SEARCH

(75) Inventor: David V. Winkler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 224 days.

(21) Appl. No.: 12/331,053

(22) Filed: Dec. 9, 2008

(65) Prior Publication Data

US 2009/0157211 A1 Jun. 18, 2009

Related U.S. Application Data

(62) Division of application No. 11/170,424, filed on Jun. 29, 2005, now Pat. No. 7,467,154.

(51) Int. Cl.
*G06F 19/00* (2006.01)
(52) U.S. Cl. .......................................... 700/98; 700/118
(58) Field of Classification Search .................... 700/98, 700/118–120, 171, 182, 186
See application file for complete search history.

(56) References Cited

U.S. PATENT DOCUMENTS

| | | | |
|---|---|---|---|
| 5,187,801 A | 2/1993 | Zenios et al. | |
| 6,148,259 A | 11/2000 | Hagelauer | |
| 6,401,002 B1 * | 6/2002 | Jang et al. ................... | 700/119 |
| 6,545,676 B1 | 4/2003 | Ryan et al. | |
| 6,741,245 B1 | 5/2004 | Marks et al. | |
| 2002/0058456 A1 | 5/2002 | Miller | |
| 2002/0076674 A1 * | 6/2002 | Kaplan ....................... | 434/107 |
| 2003/0139840 A1 | 7/2003 | Magee et al. | |
| 2003/0161400 A1 | 8/2003 | Dinerstein et al. | |
| 2004/0148284 A1 | 7/2004 | Baker | |
| 2005/0017967 A1 | 1/2005 | Ratti et al. | |
| 2005/0050299 A1 | 3/2005 | Joseph | |

(Continued)

FOREIGN PATENT DOCUMENTS

WO 0043959 7/2000

(Continued)

OTHER PUBLICATIONS

Create and Build your own LEGO Mosaic! [on-line] 2005 [retrieved Jun. 25, 2005]. Retrieved from the internet: <URL:http://shop.lego.com/productasp?p=3443M=7&d=14&c=487271C 4%2D7C76%2D4242%2D 85EE%2D7CA5C150531A>.

(Continued)

*Primary Examiner* — Sean Shechtman
(74) *Attorney, Agent, or Firm* — Shook, Hardy & Bacon L.L.P.

(57) ABSTRACT

A system and computer-implemented method for the creation of a structure using Lego building blocks is disclosed. Aspects of the methods are equally appropriate for numerous structures, including but not limited to, studs-up and studs-out configurations or a 'wall' style mosaic or a 'floor' style mosaic. Given the systems and methods disclosed, aspects of the invention are applicable to three-dimensional sculpture structures too. The system and method may use a recursive overlapping divide-and-conquer breadth-first search feature to improve the quality of the structures while only slightly, if at all, increasing the time and memory required. Furthermore, the system and method may use dithering algorithms and/or cost analysis to determine which building block can be used and placed to achieve high-quality structures. In another example, aspects of the invention may be used to more optimally schedule delivery trucks. In yet another example, aspects of the invention may be used to enhance handwriting recognition and speech recognition.

20 Claims, 7 Drawing Sheets

U.S. PATENT DOCUMENTS

2006/0036762 A1     2/2006     Vadlakonda et al.
2006/0056328 A1     3/2006     Lehane et al.

FOREIGN PATENT DOCUMENTS

WO     2004034333     4/2004
WO     2004104811     12/2004

OTHER PUBLICATIONS

'Mosaic Maker', Lugnet [on-line]. 2005, [retrieved on Jun. 25, 2005]. Retrieved from the Internet: <URL: http://www.lugnet.com/cad/mosaic/>.

What is LDraw? [on-line], [Retrieved on Jun. 25, 2005]. Retrieved from the Internet: <URL: http://www.danley.com.aulslabs004.html>.

Ullmer, et al., Emerging Frameworks for Tangible User Interfaces, Human-Computer Interaction in the New Millennium, Addison-Wesley, Aug. 2001, pp. 579-601.

Gower, et al.; "Lego: Automated Model Construction" [on-line], [Retrieved Mar. 24, 2005], Retrieved from the Internet:, <URL:http:Nmiis.maths.ox.ac.uk/pastIESGI/32/Report/lego.ps>.

Kuffner, James J., "Efficient Optimal Search of Uniform-Cost Grids and Lattices", Intelligent Robots and Systems, 2004. (IROS 2004). Proceedings, 2004 IEEEIRSJ International Conference on, vol. 2, Sep. 28-Oct. 2, 2004 pp. 1946-1951 vol.2.

Noto et al., "A method for the shortest path search by extended Dijkstra algorithm", Systems, Man, and Cybernetics, 2000 IEEE International Conference on, vol. 3, Oct. 8-11, 2000 pp. 2316-2320 vol.3.

Terdiman, Daniel; "Hacking's a snap in Legoland"; http://www.news.com/; http://news.com.com/Hackings+a+snap+in +Legoland/2100-1046_3-5865751.html; Sep. 15, 2004.

Designer Legos [on-line]. CNET News.com, 2005, [retrieved on Sep. 20, 2005], Retrieved from the internet: <URL:http://news.com.com/2300-1046_3-5865672-2.html.

Designer Legos [on-line]. CNET News.com, 2005, [retrieved on Sep. 20, 2005], Retrieved from the internet: <URL:http://news.com.com/2300-1046_3-5865672-2.html.

"What is LDraw?" [on-line]. Ldraw.org, 2005, [retrieved on Sep. 20, 2005], Retrieved from the internet: <URL:http://www.Idraw.org/.

Rebecca A. H. Gower et al. "LEGO: Automated Model Construction", pp. 81-94, retrieved from the Internet Feb. 16, 2011, http://www2.mat.dtu.dk/ESGI/32/Report/lego.ps.

James J. Kuffner "Efficient Optimal Search of Uniform-Cost Grids and Lattices", pp. 1946-1951, Proceedings of 2004 IEEE/RSJ International Conference on Intelligent Robots and Systems, Sep. 28-Oct. 2, 2004; Sendal, Japan, 0-7903-8483-8/04/$20.00, Copyright 2004 IEEE.

Masato Noto, et al. "A Method for the Shortest Path Search by Extended Dijkstra Algorithm", Systems, Man, and Cybernetics Oct. 2000 IEEE International Conference, pp. 2316-2320, 0-7803-6583-6/00/$10.00, Copyright 2000 IEEE.

Daniel Terdiman, "Hacking's a snap in Legoland", 1 page, CNET News.com; Sep. 15, 2005; http://news.com.com/Hackings+a+snap+in+Legoland/2100-1046_3-5865751.html?tag**st.util.print.

Lego, "Photos: Designer Legos", 1 page, CNET News.com Tech News First; Advertisement; Sep. 2005; http://news.com.com/2300-1046_3-5865672-1.html.

Lego, "Photos: Designer Legos", 1 page, CNET News.com Tech News First; Advertisement; Sep. 2005; http://news.com.com/2300-1046_3-5865672-2.html.

LDraw.org; "What is LDraw?", Centralized LDraw Resources; 2 pages; Sep. 20, 2005; http://www.ldraw.org/.

Brygg Ullmer, et al. "Emerging Frameworks for Tangible User Interfaces", in "Human-Computer Interaction in the New Millenium" John M. Carroll, ed.; copyright Addison-Wesley, pp. 579-601. Copyright Aug. 2001.

Rong Zhou "Space-Efficient Heuristic Search for Optimal Planning", American Association for Artificial Intelligence (www.aaai.org) Copyright Jan.-Dec. 2004, 5 pages.

Richard E. Korf, et al. "Divide-and-Conquer Frontier Search Applied to Optimal Sequence Alignment", American Association for Artificial Intelligence (www.aaai.org) Copyright Aug. 2000, 7 pages.

Lugnet, "Mosaic Maker", 1 page, webpage hosted by steinbruch.info GbR; http://www.lugnet.com/cad/mosaic/. Copyright 2005. [Retrieved from the Internet on Jun. 25 2005].

* cited by examiner

PRODUCING A LOCALLY OPTIMAL PATH THROUGH A LATTICE BY OVERLAPPING SEARCH

CROSS-REFERENCE TO RELATED APPLICATIONS

This application is a divisional of U.S. patent application Ser. No. 11/170,424, filed Jun. 29, 2005, entitled, "PRODUCING A LOCALLY OPTIMAL PATH THROUGH A LATTICE BY OVERLAPPING SEARCH", the entirety of which is incorporated herein by reference.

A portion of the disclosure of this patent document may contain material which is subject to copyright protection. The copyright owner has no objection to the facsimile reproduction by anyone of the patent document or the patent disclosure, as it collectively appears in the Patent and Trademark Office patent file or records, but otherwise reserves all copyright rights whatsoever.

BACKGROUND

Many fields involve finding the shortest path through a lattice. For example, this problem is core to a computer system recognizing a word that has been handwritten using a stylus, determining resource allocation for a project, circuit design, or laying out pieces for a LEGO® brand building block sculpture. However, calculating an exact solution may not be feasible in computer memory or within a specified amount of time. Rather, the traditional approach is a beam search, which eliminates paths through the lattice that are unlikely to be helpful. Unfortunately, this traditional approach reduces accuracy (i.e., quality/optimality of the solution) to conserve time and memory.

There is also a need in the art for a solution to the problem of finding a less costly method for filling a fixed region with building blocks of a particular color. For example, companies, such as LEGO® hire professionals to build many of their sculptures by hand. The process can be slow, tedious, and costly. While alternative solutions using artificial intelligence (AI) have been proposed, none to date have fulfilled the long-standing need in the art.

Therefore, there is a need in the art for a system and method to generate instructions for assembling a higher-quality, less-costly LEGO® structure. More generally, there is a need in the art for a method and system for, inter alia, calculating a path through a lattice that recovers accuracy without increasing memory, and only moderately increasing time.

SUMMARY

The following represents a simplified summary of some embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in simplified form as a prelude to the more detailed description that is presented below.

Aspects of the present invention generally relate to a method and system for finding a less costly path through a lattice. More specifically, aspects of the present invention relate to a computer-assisted method and system of a technical nature to enhance the placement of building blocks in a region to assemble a structure given limited resources.

The invention may be practiced in any application where a more optimal path through a lattice is desired. In accordance with various aspects of the invention, a computer-implemented method of generating a less costly or sub-optimal path through a lattice is disclosed. The method may utilize various search methods, including, but not limited to, beam-type breadth-first searches. Moreover, much of the method may be performed both iteratively and recursively to obtain high quality results. Furthermore, aspects of the invention use overlapping regions for a divide-and-conquer beam search to obtain many benefits.

Furthermore, a system and computer-implemented method of generating instructions for filling a predetermined region with building blocks to assemble a structure is also disclosed. Aspects of the invention may determine the cost of traversing through a lattice or graph using one or more cost functions. In accordance with various aspects of the invention, a cost function may depend on numerous factors/considerations, including the price of a particular building block and the change in structural integrity of a structure. Meanwhile, the invention may be enhanced through the converting of non-visible building blocks to a less costly color, and through the hollowing of the interior of a predetermined region.

Finally, a computer-readable medium comprising computer-executable instructions for performing a computer-implemented method of generating a less costly path through a lattice is disclosed. Also disclosed is a computer-readable medium comprising computer-executable instructions for performing a computer-implemented method of generating instructions for filling a predetermined region with building blocks to assemble a structure.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
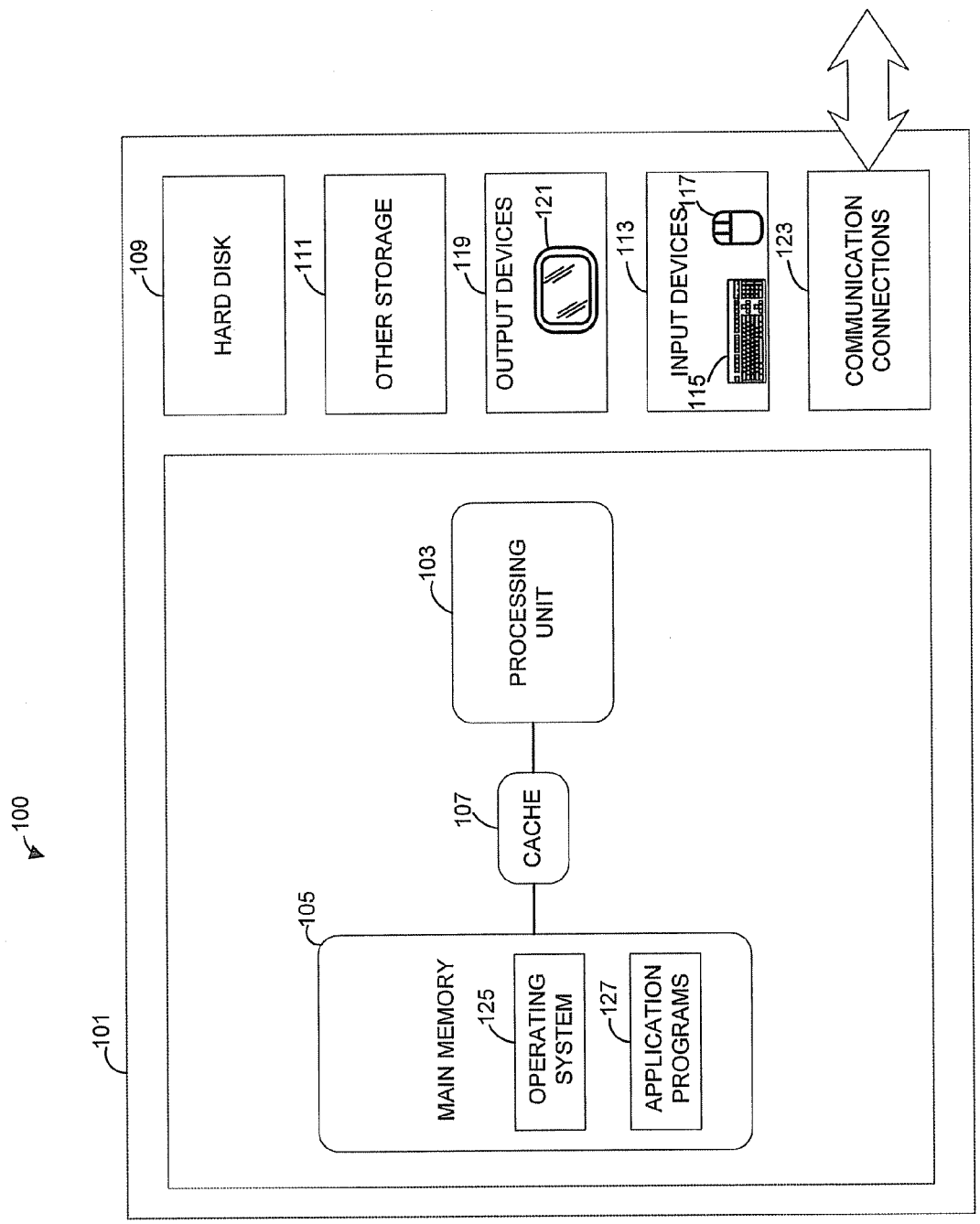
FIG. 1 illustrates a schematic diagram showing an illustrative computer operating environment within which various aspect of the present invention may be incorporated.

An example of a suitable operating environment 100 in which various aspects of the invention may be implemented is shown in the highly simplified schematic diagram in FIG. 1. The features of such environments are well-known to those having skill in the art and need not be described at length here.

The operating environment 100 is only one example of a suitable operating environment and is not intended to suggest any limitation as to the scope of use or functionality of the invention. Suitable computing environments for use with the invention include any computing device or computing system that supports interaction between user and machine.

With reference to FIG. 1, an illustrative system for implementing aspects of the invention includes a computing device, such as device 101. Device 101 commonly includes at least one processing unit 103 and memory, e.g., main memory, unit 105, and at least one level of cache memory 107 connected to or situated within the processing unit 103 and serving as a buffer for the main memory 105. Device 101 may have additional storage, including at least one magnetic hard disk 109 that serves as nonvolatile secondary storage and which is additionally used along with the main memory 105 in providing virtual memory. Device 101 may also have other storage 111, such as optical disks, removable magnetic disks, magnetic tape, and other removable and nonremovable computer-readable media capable of nonvolatile storage of program modules and data and accessible by device 101. Any such storage media may be part of device 101. To facilitate user-machine interaction, device 101 has input devices 113, such as a keyboard 115 and a mouse 117 or other pointing device, and output devices 119, including a printer, plotter, automated CNC cutting machine, monitor, or other display device 121. Device 101 also typically includes one or more communication connections 123 that allow the device to communicate data with other devices.

Programs, comprising sets of instructions and associated data for the device 101, are stored in the memory 105, from which they can be retrieved and executed by the processing unit 103. Among the programs and program modules stored in the memory 105 are those that comprise or are associated with an operating system 125 as well as application programs 127. The device 101 has one or more systems of logical data storage, such as a file system or alternative systems using database-related techniques, associated with the operating system 125. Such systems of logical data storage serve as interfaces that map logically-organized data to data physically located on secondary storage media, such as data stored in clusters or sectors on the hard disk 109.

Computing device 101 includes forms of computer-readable media. Computer-readable media include any available media that can be accessed by the computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

In accordance with various aspects of the invention, a system and computer-implemented method for the creation of a structure using LEGO® brand building blocks is disclosed. Those of skill in the art will appreciate that other types of building blocks may alternatively be used. Aspects of the methods are equally appropriate for numerous structures, including but not limited to, studs-up and studs-out configurations or a 'wall' style mosaic or a 'floor' style mosaic. Given the systems and methods disclosed, aspects of the invention are applicable to three-dimensional sculpture structures, too. The system and method may use a recursive overlapping divide-and-conquer breadth-first search feature to improve the quality of the structures while only slightly, if at all, increasing the time and memory usage required. Furthermore, the system and method may use dithering algorithms and/or cost analysis to determine which building blocks can be used and placed to achieve high-quality structures. In another example, aspects of the invention may be used to more optimally schedule delivery trucks. In yet another example, aspects of the invention may be used to enhance handwriting recognition and speech recognition.

Figure 2:
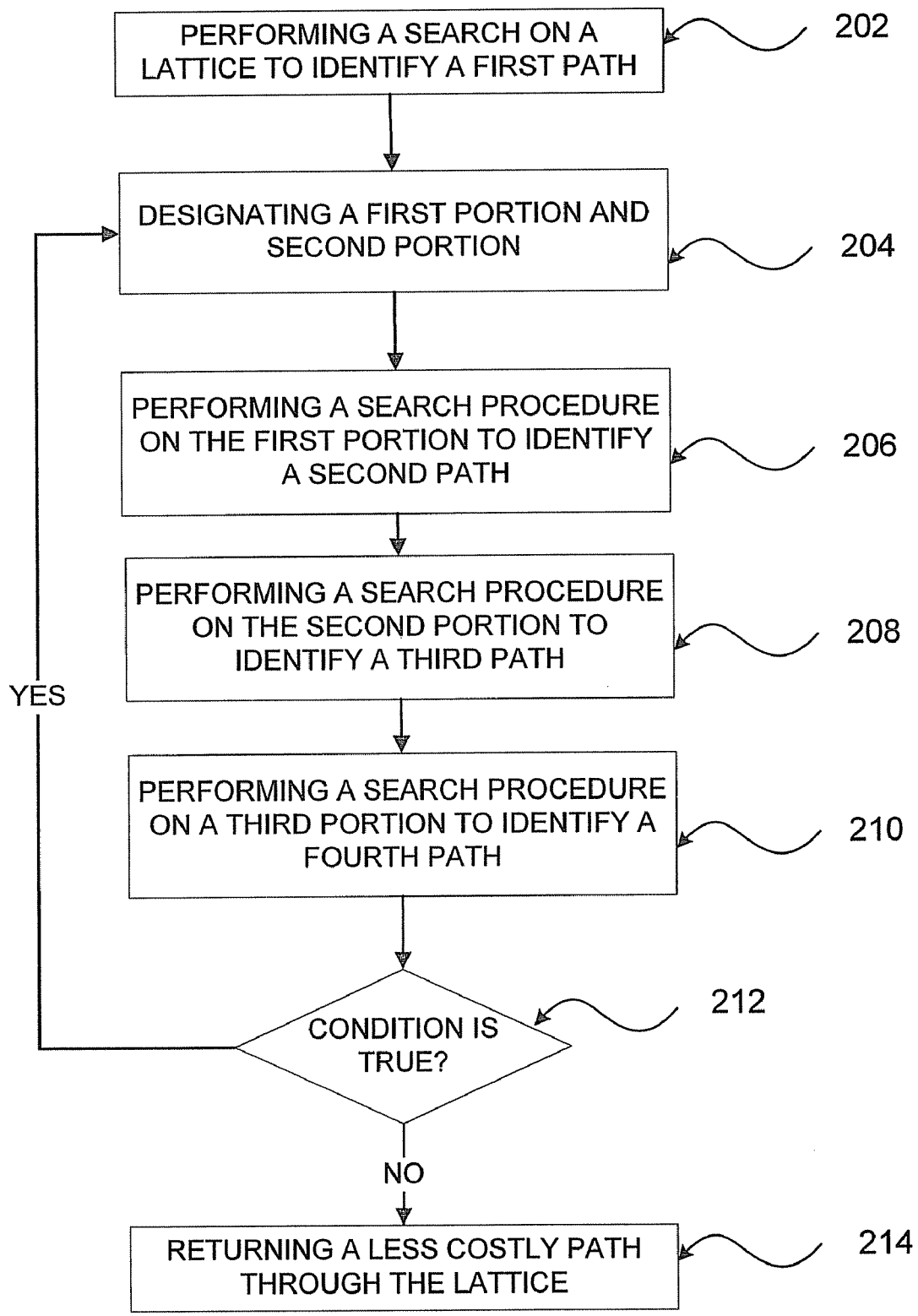
FIG. 2 illustrates a flowchart describing a method for a computer-implemented method of generating a less costly path through a lattice in accordance with various illustrative aspects of the invention.

In FIG. 2, a flowchart in accordance with various aspects of the invention is disclosed. Those skilled in the art will appreciate that the steps illustrated in FIG. 2 may be performed in other than the recited order, and that one or more steps illustrated in FIG. 2 may be optional. Moreover, one or more steps may be performed simultaneously, e.g., step 206 and step 208 may be performed simultaneously in separate threads in a multi-tasking operating environment. FIG. 2 illustrates a method of generating a less costly path through a lattice according to an illustrative aspect of the invention. Various embodiments of the invention allow for the calculation of a less costly path through a lattice without consuming more memory than traditional methods. Meanwhile, in various other embodiments of the invention, the memory usage may be increased above that of traditional methods to realize a decrease in required time or an increase in the quality of the path. One skilled in the art will appreciate that memory usage, time, and quality are related factors in that adjusting one may result in the other factors also being adjusted. Finally, one skilled in the art will recognize that the quality of a path refers, inter alia, to the cost of the solution, whereby reduced cost may suggest higher quality.

Furthermore, one skilled in the art will understand that a lattice may be embodied as a graph with a set of vertices and a set of edges (or arcs). In one example, the vertices may be used to represent a particular arrangement of building blocks in a region, and the edges may represent the addition of a building block to a particular arrangement. Graphs may be implemented in at least two different ways in a memory unit of a computer system: an adjacency matrix representation, or an adjacency list representation. The benefits of each representation will be apparent to one skilled in the art. In addition, sometimes an edge may have a cost (or weight) associated with it. For example, a cost of an edge may be the cost of traversing from a first vertice to a second vertice, e.g., the cost of adding an additional piece to a particular arrangement of building blocks in a fixed region. In some instances, the cost may be calculated using a cost function. After thorough review of the entire disclosure, one of ordinary skill in the art will understand that a cost function in accordance with various aspects of the invention may be comprised of a plurality of factors/considerations. These factors will be discussed in greater detail below.

In addition, the lattice may contain a start point and end point. In one example relating to the assembly of building blocks into a grid region, e.g., a region of size 32×32, the start point may be an empty n-by-m dimension region. In another example, the region to be filled may be an arbitrary shape on a grid, e.g., a square or rectangular grid. Meanwhile, the end point may be the n-by-m dimension region filled. A person of ordinary skill in the art at the time of the invention will understand that traversing the lattice from a start point to an end point may represent the solution to a problem, e.g., the problem of efficiently filling a region with building blocks. In one example, the end point may be just the grid region filled in with the appropriate color building blocks. This may be done by first filling the region with blocks without paying attention to the cost or optimal placement of particular building block of varying dimensions. In accordance with various aspects of the invention, a computer-implemented method of generating a less costly path through the lattice may be used to determine a more optimal placement of building blocks to fill the grid region.

In accordance with various aspects of the invention, the lattice may be populated with data on-the-fly. One skilled in the art will understand that pre-filling the entire lattice with data, rather than populating it on-the-fly, is the same problem as finding the optimal path through the lattice. For example, calculating a path through a lattice using Dijkstra's algorithm on a completely pre-filled lattice would result in an optimal path. However, the memory consumption of the aforementioned completely pre-filled lattice may be enormous; thus, rendering it infeasible or impractical in some situations. If the lattice is populated on-the-fly, the memory consumption requirements may be greatly reduced, while still generating a sub-optimal path. One skilled in the art will appreciate that the optimality of a solution may be tweaked by, inter alia, increasing the memory consumption. This and other aspects of the invention will be understood by one skilled in the art after thorough review of the entire disclosure.

In step 202, a first path is identified by performing a search on the lattice. In accordance with various aspects of the invention, a breadth-first search may be used to calculate a rough approximation of a path through a lattice. One example of a breadth-first search is a beam-type search. A beam search usually generates a good, but sub-optimal path through a lattice by limiting the breadth of the breadth-first search. The maximal breadth of a beam search is referred to as the width of the beam. Although the width of the beam is typically a fixed number, one skilled in the art will appreciate that this is not necessarily required. For example, a modified beam search may significantly reduce memory requirements while still allowing a larger beam width. A larger beam width may improve the quality of the sub-optimal path generated. For example, the width of the beam in a beam search may be modified to adjust the memory, time, and/or quality of the resulting outputted path. In addition, a breadth-first search in accordance with various aspects of the invention also includes breadth-first heuristic searches such as modified beam search, e.g., a divide-and-conquer beam search. A divide-and-conquer technique may divide the lattice into smaller problems that may be solved recursively, and then conquer the original problem by joining the solutions to the sub-problems. Finally, a best-first search, or other type of search, may be used as a substitute for a breadth-first search. There are many different conventional methods of determining a path through a lattice including, but not limited to, traditional beam search methods, traditional fast search methods, traditional divide-and-conquer methods, and Dijkstra's algorithm.

In step 204, a first portion of the lattice and a second portion of the lattice may be designated. As previously discussed, a divide-and-conquer beam search may be used to search the lattice for a path. The first portion and second portion of the lattice may be provided separately to calculate a path through each lattice portion. At least one benefit of this arrangement is reduced memory usage. Most conventional divide-and-conquer methods suggest calculating a proximate midpoint of a lattice as a boundary for dividing the lattice into first and second portions, e.g., first and second halves. In other words, the first and second portion of the lattice are non-overlapping. Meanwhile, one skilled in the art will understand that an exact midpoint may not always be possible, therefore, a proximate midpoint may be used to determine the boundary between portions. A proximate midpoint may be calculated as the midpoint approximately between a predetermined start point of a relevant portion of a lattice and a predetermined end point of a relevant portion of a lattice. In this example, the entire lattice is the relevant portion of the lattice.

In an illustration, which continues with the earlier example relating to building blocks, a grid region filled with N blocks may be divided into two portions by, first, numbering each block from top left to bottom right. Then, the area covered by the first N/2 (i.e., N divided by 2) blocks is the first portion, and the area covered by the second N/2 (i.e., N divided by 2) blocks is the second portion. In the event that N is an odd number, one portion will have an additional block. Nevertheless, in this example, the sum of the size of the first portion of the lattice and the size of the second portion of the lattice will equal the size of the entire lattice. One skilled in the art will appreciate that there may be other ways to divide the region into portions in accordance with various aspects of the invention.

Then in step 206 and 208, a search procedure is separately performed on the first portion and second portion of the lattice to identify less costly paths through those portions of the lattice. The search procedure performed may simply be a traditional search method, e.g., beam search. Alternatively, the search procedure may incorporate divide-and-conquer methods, such as those discussed herein. In yet another example, the search procedure may be defined to comprise step 204 to step 212, and be performed recursively. In other words, the search procedure may be recursively performing an overlapping divide-and-conquer beam search. At least one benefit of a recursive implementation over a non-recursive (e.g., iterative or stack-based) implementation is higher quality results. For example, a second path generated by performing a search procedure on the first portion of the lattice may be of lower quality than one generated by recursively performing the same search procedure on the same first portion of the lattice. Likewise, a third path generated by performing a search procedure on the second portion of the lattice may be of lower quality than one generated by recursively performing the same search procedure on the same second portion of the lattice.

Finally, in step 210, a third portion of the lattice is designated. The third portion comprises at least a part of the first and second portions of the lattice. In other words, the third portion overlaps with the first and second portions. While the amount of overlap may be adjusted, the greater the overlap, the higher the quality of results returned may be. In some examples the third portion may be calculated by determining the portion that starts approximately 25% from the start point to the end point and ends approximately 75% from the start point to the end point (i.e., the third portion encompasses the center portion of the lattice).

In addition, step 210 includes the step of performing a search procedure on the third portion of the lattice to identify a fourth path. Like steps 206 and 208, the search procedure of step 210 may be a simple traditional search method, or may be a more complicated implementation. Similarly, the search procedure may be defined to comprise step 202 to step 212, and be performed recursively. At least one benefit of an overlapping search as is performed in step 210 is an increase in quality while only moderately increasing time and without increasing memory usage. Moreover, if memory is limited, memory swap time may be recovered using aspects of the invention to obtain similar quality results in similar time with less memory. Yet another advantage of an overlapping search is to overcome the problem of local minima. One skilled in the art will appreciate that a local minima may hinder further optimization.

Meanwhile, steps 204 to 210 may be iteratively performed while a condition is true (pursuant to step 212). In one example, steps 204 to 210 are iteratively performed so long as a predetermined time interval has not expired. In another example, the aforementioned steps are iteratively performed until a reasonable measure of quality has been achieved. In yet another example, the aforementioned steps are iteratively performed until the outputted paths begin to converge. One skilled in the art will understand that other conditions may be desirable to achieve particular goals, such as achieving a certain level of quality, completing a search within a particular time interval, and/or meeting particular thresholds. Furthermore, with each iteration the size and/or position of the first portion, second portion, and third portion, may change. In fact, the boundary between the first and second portion will frequently change as a result of step 210. After each iteration, the calculation in step 204 may result in a different portion of the lattice being designated as the first portion and the second portion.

Finally, in step 214 a less costly path through the entire lattice may be returned by combining the second path, the third path, and the fourth path. One skilled in the art will appreciate that an entire path or portions of a path may be used when being combined to generate the less costly path. In addition, it is well-known in the art that although beam search produces a good path (e.g., sub-optimal) through a lattice, it may not produce the optimal path through a lattice. Although more optimal paths may exist (and may be located using e.g., Dijkstra's algorithm), the less costly path is a practical solution that results in high-quality outputs with reduced memory usage.

Figure 3:
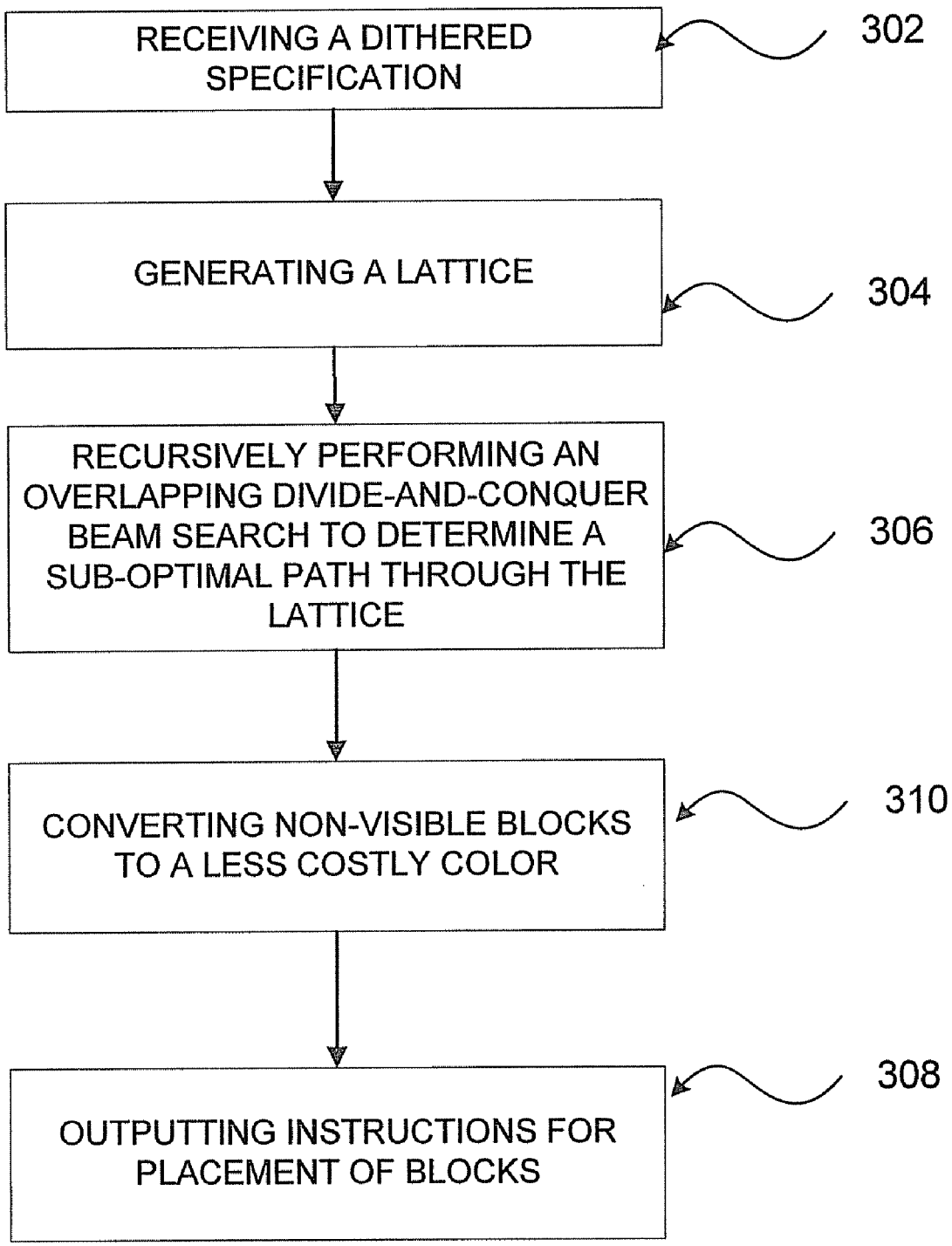
FIG. 3 illustrates a flowchart describing a method for a computer-implemented method of generating instructions for filling a predetermined region with building blocks to assemble a structure in accordance with various illustrative aspects of the invention.
Figure 4:
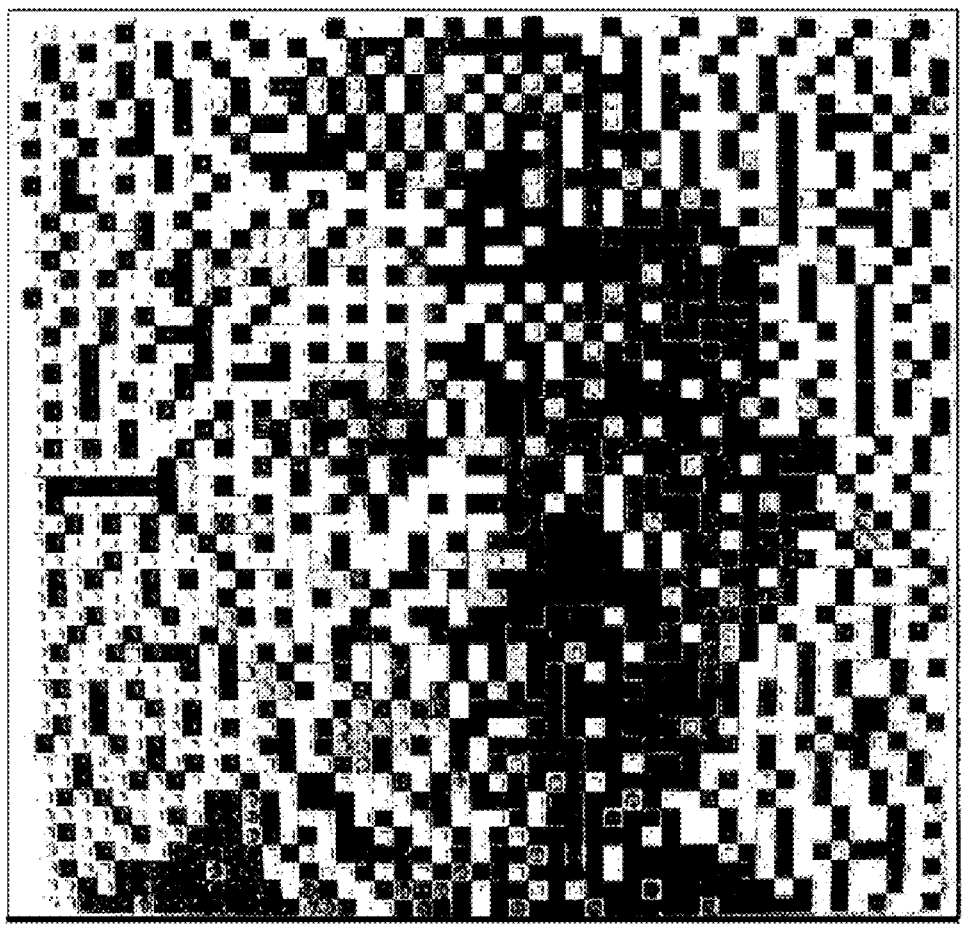
FIG. 4 illustrates a LEGO® floor mosaic in accordance with various illustrative aspects of the invention.
Figure 5:
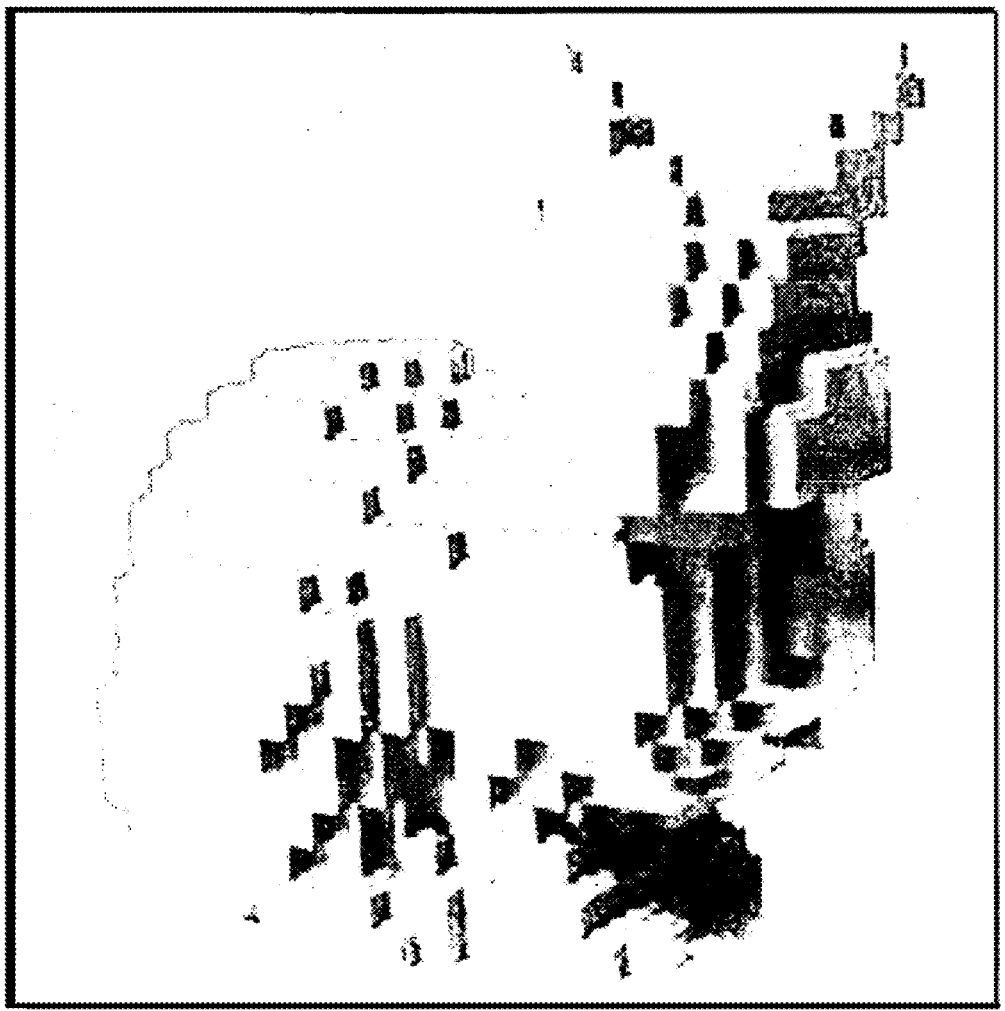
FIG. 5 illustrates a LEGO® 3-dimensional sculpture structure built in accordance with various illustrative aspects of the invention.

In accordance with various aspects of the invention, FIG. 3 illustrates a computer-implemented method of generating instructions for filling a predetermined region with building blocks to assemble a structure. For example, structures, e.g., wall mosaics, floor mosaics, and 3-dimensional sculptures can be made using LEGO® building blocks of different dimensions and colors. In particular, a floor mosaic 400 is a structure built with a stud-out configuration of the Lego building blocks, as illustrated in FIG. 4. They are usually built by placing Legos next to each other and viewing the tops of the Legos. Thus, floor mosaics display the Lego stud. Meanwhile, a 3D Lego sculpture 500 is a structure built by assembling horizontal layers of the sculpture using building blocks, as illustrated in FIG. 5. The specification for the 3-dimensional bunny is the standard research model used in many computer graphics projects and has been used with the permission of the Stanford Computer Graphics Laboratory.

In step 302, a dithered specification of the structure is received. For example, in the case of a sculpture, the dithered specification may be obtained using the constructive solid geometry (CSG) feature of the persistence of vision raytracer (POV-RAY) program. CSG is a technique for representing a solid object as a combination of simpler solid objects, e.g., building blocks, and is commonly used in 3-dimensional computer graphics and CAD. A CSG object is intersected with a plane while the plane is moved through a sculpture or object. As a result, an image is produced for each layer. These images may be reduced in size to a desired final size of the building block structure. These images layers represent the set of positions where Lego building blocks will be present in the finished structure. Next, to calculate the best layout for the current image layer, the layers adjacent to a particular layer are analyzed. As the iteration through each layer progresses, each adjustment reduces the overall error of the dithered specification of the 3d sculpture. Therefore, the changes will eventually converge.

In addition, it may be desirable in some instances to hollow out the interior of a predetermined region to reduce costs. One skilled in the art will recognize that hollowing out a predetermined region of a layer of the structure may reduce its structural integrity. In addition, the cost of placing a particular building block of a given dimension at a particular position may be affected by the impact such placement has on the structural integrity of the structure. While there are many factors that may be taken into account to determine the cost of a given building block configuration, the following three factors may are related to structural integrity: (1) cost increases if more than 25% of a piece is over empty space, (2) cost decreases if a larger building block covers more unique pieces (because, inter alia, the larger block will hold together the unique pieces), and (3) cost decreases with more variance of the pieces (because, inter alia, it is structurally stronger to bridge an empty space than to cantilever). One skilled in the art will appreciate that values other than 25% may be used in calculating the structural integrity cost in the factor described above. Although various embodiments of the invention may more heavily weigh some factors over others, structural integrity and the overall cost may be enhanced by weighing factor 1 more heavily than factor 2, and factor 2 more heavily than factor 3.

Furthermore, different LEGO® building blocks may have different costs. For a mosaic structure, the cost of edges in a graph (e.g., lattice) may be the price of placing that LEGO® block. For a sculpture structure, however, an additional factor of cost may be how much that particular LEGO® piece contributes to its structural integrity. In accordance with various aspects of the invention, these factors, inter alia, may be included in a cost function. Cost function data related to a lattice may be stored in the memory unit and used to assist in determining the cost of a given path. An illustrative cost function data may be comprised of the price of a building block of a particular dimension and color, and the structural integrity of the placement of a building block in a particular location.

In step 304, a lattice is generated corresponding to the dithered specification received in step 302. One skilled in the art will understand after thorough review of the entire disclosure that a lattice may be embodied as a graph with a set of vertices, a set of edges, and a cost function. In accordance with various aspects of the invention, the lattice generated in step 304 may be a rough approximation calculated in connection with a fast beam search used to fill the region with building blocks. One skilled in the art will understand that narrowing the beam width of the beam search will result in a rougher approximation. The path generated through this lattice may be a rough approximation of a solution for assembling building blocks to fill a predetermined region on the grid. The solution generated by the rough approximation may be optimized by steps, e.g., step 306, performed in accordance with aspects of the invention.

In addition, a list of available sizes of LEGO® building blocks and their corresponding cost by color may also be input into the system for storing as cost function data. For instance, a green 1×8 Lego may be more expensive than a black 2×4 Lego. This and other information may be found on various Internet website dedicated to providing prices for different LEGOS®. These and other inputs may be useful in determining a less costly path through the lattice. For example, it may be beneficial to convert non-visible building blocks to a less costly color. Non-visible building blocks would be those blocks that are completely inside a structure, thus not viewable. One skilled in the art may, e.g., as a post-processing step, convert non-visible blocks to a less costly color in step 310 to reduce costs. It is worth reiterating that, as mentioned earlier regarding FIG. 2, the steps of FIG. 3 (and any flowchart figure disclosed herein) may be performed in other than the recited order, and that one or more steps illustrated may be optional and/or performed simultaneously. For example, in accordance with the invention, step 310 may be performed in an order different than that in which it appears in FIG. 3.

Next in step 306, an overlapping divide-and-conquer beam search may be recursively performing on the lattice to determine a sub-optimal path through said lattice. As was discussed in greater detail above, the overlapping divide-and-conquer beam search (i.e., search procedure) is a novel searching technique that results in a higher quality structure with no or little increase in memory usage over conventional search methods. This search procedure may also be performed recursively to benefit from higher quality results. Consequently, the resulting sub-optimal path through the lattice may be used to determine instructions for the placement and color of the building blocks of different dimensions, colors, and costs in the predetermined region. One skilled in the art will appreciate that lattices (e.g., graphs) of this kind may be used to obtain solutions to other problems of this type.

Finally in step 308, instructions for the placement of building blocks in the predetermined region to assemble a desired structure are provided for display on an output device. In one example, the output device may be a printer, whereby a person may print the instructions for use in manually assembling the structure. In another example, the instructions may be in the form of computer-executable instructions for a machine to automatically assemble the structure. An example of such a machine may be a hypothetical machine analogous to a computer numeric control (CNC) machine for LEGOS®, which is able to automatically place LEGO® building blocks of a particular dimension and color at a particular position when given machine-readable commands.

Figure 6:
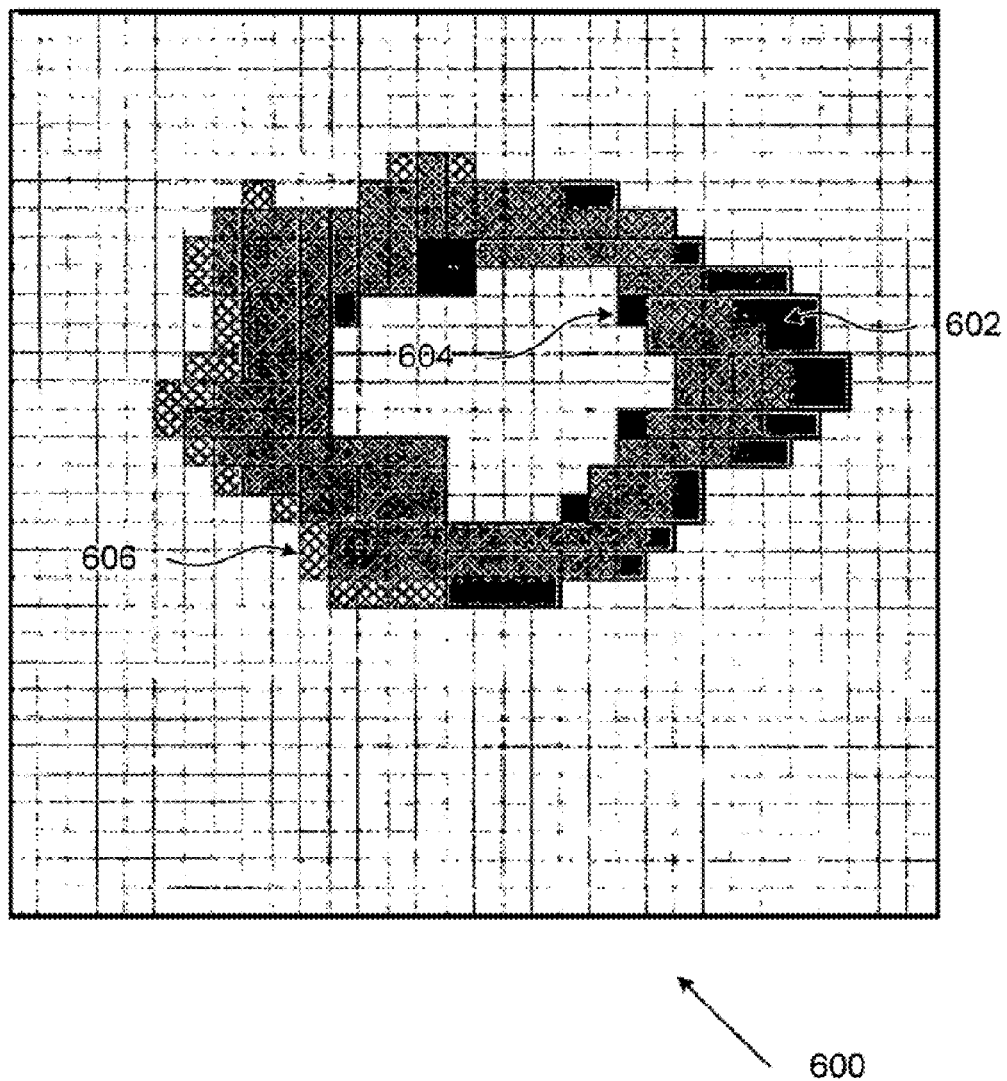
FIG. 6 illustrates visual instructions for building block placement in accordance with various illustrative aspects of the invention.

The instructions for filling a region with building blocks to assemble a structure may be in various forms. For example, the instructions may be comprised of a textual explanation of building block placement, e.g., a description of the placement of building blocks using words. In another example, the instructions may be comprised of a visual representation of building block placement in a grid. Moreover, cross-hatched marking may be used to designate building blocks from an adjacent layer. FIG. 6 illustrates just one example of visual instructions for block placement. In FIG. 6, the grid 600 containing the predetermined region for filling is a 32×32 grid. Meanwhile, building block 602 is a yellow (color not shown) block of 2×4 dimension for placement at the indicated grid position in that layer of the structure. Meanwhile, building block 604 is a non-visible building block and is designated as such by being blacked out. Finally, the building block represented by the cross-hatched marking 606 is from the adjacent layer below the current layer. At least one benefit of the cross-hatched markings is to enable a user assembling a LEGO® structure to verify the proper placement of building blocks upon a lower layer. In this example, FIG. 6 represents the layer immediately above the bottom layer of the rabbit sculpture displayed in FIG. 5. For example, the rabbit in FIG. 5 may be sliced into 24 layers of building blocks. Instructions for each layer may be provided by visual representations similar to FIG. 6. At least one advantage of such instructions is the enhanced convenience and efficiency with which a user may manually assemble a structure.

Figure 7:
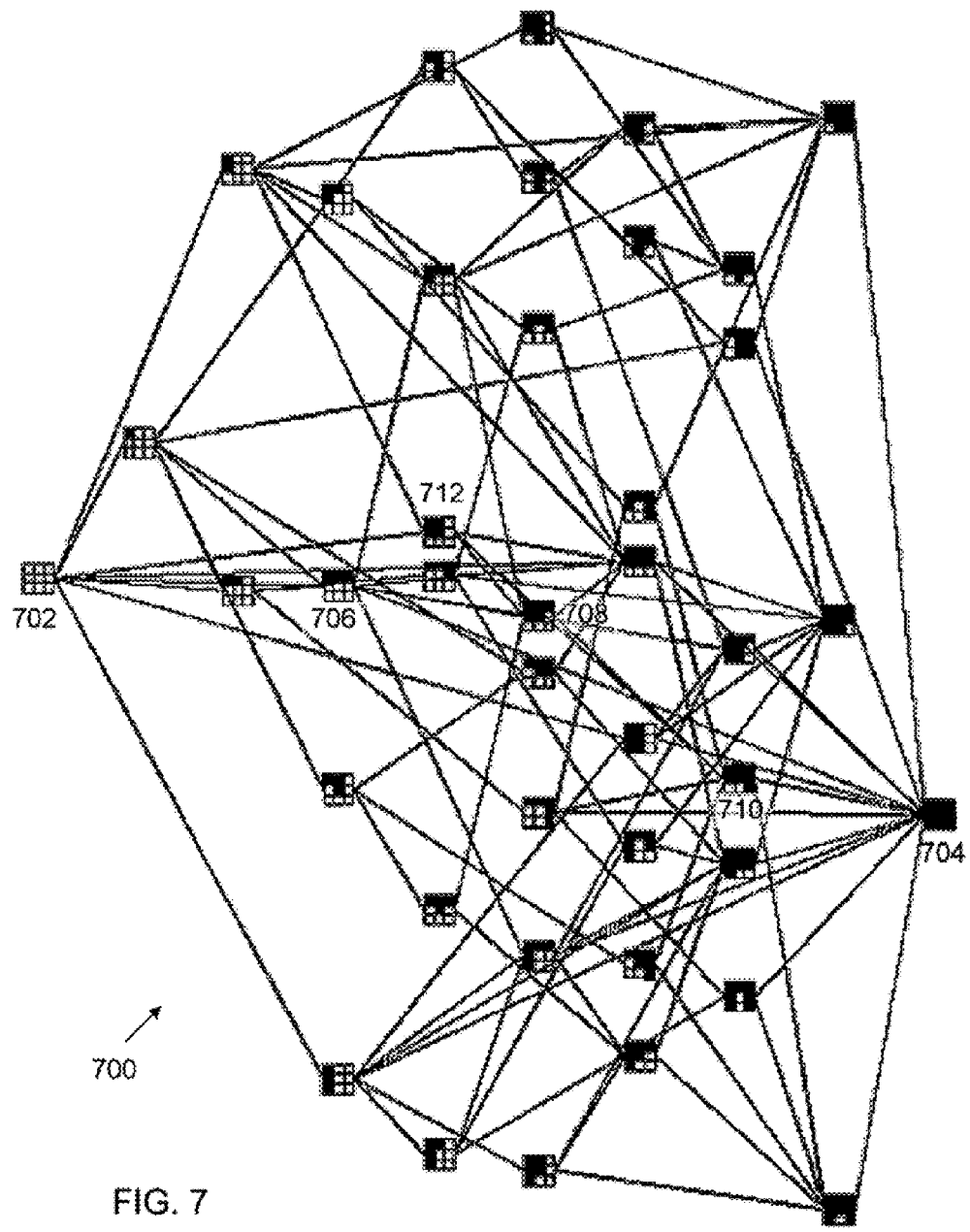
FIG. 7 diagrams a lattice or graph depicting possible solutions for filling a predetermined region of 3×3 dimension with building blocks to assemble a structure in accordance with one or more features of the invention.

Referring to FIG. 7, a lattice 700 (or graph) used for filling a predetermined region of 3×3 dimension with building blocks is depicted. In just one example using FIG. 7, the vertex representing the predetermined start point 702 is an empty region of 3×3 dimension, and the vertex representing the predetermined end point 704 is a region of 3×3 dimension filled with building blocks. Each vertex visually represents the state of the predetermined region of 3×3 dimension. For example, predetermined start point 702 represents the predetermined region in an empty state (i.e., no building blocks in the region), and predetermined end point 702 represents the predetermined region in a state where the entire region is filled with building blocks. Meanwhile, vertex 706 represents the predetermined region in a state where the top row (i.e., top 3 cells in the grid) is filled.

A breadth-first search performed on the lattice 700 may result in a rough approximation through the lattice in the following path: start point 702 to vertex 706 to vertex 708 to vertex 710 to end point 704. The cost of traversing from start point 702 to vertex 706 may be the cost associated with adding a building block of 1×3 dimension of a particular color to that location, as depicted in the tiny graphic for vertex 706, in the predetermined region. Likewise, traversing each remaining vertex in the aforementioned path results in an additional building block being added to the solution at a particular cost. The aforementioned path results in a solution consisting of filling the predetermined region with one 1×3 dimension building block and three 1×2 dimension building blocks to assemble a structure.

In accordance with various aspects of the invention, the aforementioned path generated through the lattice in FIG. 7 may be optimized by recursively performing an overlapping divide-and-conquer beam search on the lattice. Continuing with the prior example, the lattice may be divided into two portions, such that both portions together equal the size of the entire lattice. In one example, the lattice may be divided at the approximate mid-point of the lattice. Assuming the aforementioned path resulted in four building blocks being added to the region, the approximate mid-point may be vertex 708, which is where the 2nd piece (i.e., the N/2 piece, where N is the total number of pieces added to fill the region) was added. Therefore, in this example, the first portion is the lattice from vertex 702 to vertex 708, and the second portion is the lattice from vertex 708 to vertex 704.

A recursive overlapping divide-and-conquer breadth-first search, e.g., a modified beam search, may be performed on a first portion of the lattice between the predetermined start point 702 and the proximate midpoint 708. For example, the resulting path through this first portion of the lattice may be from vertex 702 to vertex 712 to vertex 708. Meanwhile, performing the same search procedure, e.g., recursive overlapping divide-and-conquer breadth-first search, on a second portion of the lattice between proximate midpoint 708 to predetermined end point 704 may result in a path through the lattice as follows: vertex 708 to vertex 710 to vertex 704. Notice that in some instances the prior path may cost less or be equal in cost to the resulting path. In those instances, it may be beneficial to maintain the prior path through the lattice as part of the final solution.

Finally, in accordance with the invention, a recursive overlapping divide-and-conquer breadth-first search may be performed on a third portion of the lattice that is overlapping at least partially with the first portion and at least partially with the second portion. For example, a proximate midpoint 712 between the predetermined start point 702 and proximate midpoint 708 may be one endpoint of the third portion of the lattice. Meanwhile, the proximate midpoint 710 between the proximate midpoint 708 and the predetermined end point 704 may be another endpoint of the third portion of the lattice. The resulting optimal path generated through the third portion of the lattice may be directly from vertex 712 to vertex 710. Assuming that the path from vertices 712 to 708 to 710 is more costly than the cost of traversing from vertices 712 to 710, the overall cost of the solution has decreased.

Given that the resulting path is usually less costly than the prior solution, each iteration of the steps of the search procedure described above usually result in a more optimal solution. The iterations may conclude once a predetermined condition has been met. For example, the condition may be related to the expiration of a fixed amount of time. In another example, the condition may be related to the iteration occurring a fixed number of times. In yet another example, the condition may be true so long as the cost of the resulting path is decreasing.

Finally, an optimal path through the entire lattice may be determined through a combination of each of the aforementioned resulting paths. Continuing with the preceding example, the final optimal path through the entire lattice is from predetermined start point 702 to vertex 712 to vertex 710 to vertex 704. This solution results in three less costly building blocks (i.e., one 2×2 dimension block, one 1×3 dimension block, and one 1×2 dimension block) being placed to fill the predetermined region, instead of the more costly solution involving four blocks that was originally described for the predetermined region of 3×3 dimension. A system in accordance with aspects of the invention may use the final optimal path to output instructions, such as those described earlier, for the placement of the building blocks in the predetermined region.

After through review of the entire disclosure, it will become apparent to one skilled in the art that there are numerous practical applications for various aspects of the invention. For example, aspects of the recursive overlapping divide-and-conquer beam search may be applied to any problem involving the calculation of a less costly path through a lattice or graph. For instance, speech recognition and handwriting recognition products and methods may take advantage of various aspects of the invention. Additionally, chess programs and other similar strategy board games may benefit from a stronger computer opponent in gaming. The memory and quality enhancements resulting from numerous examples may be beneficial in such an environment. Furthermore, truck delivery services, e.g., UPS or FedEx, may also benefit from various aspects of the invention by providing a less costly delivery schedule given trucks and their destinations. For example, a graph for a UPS scheduling problem may include vertices representing a point in time and edges representing the weight (or cost) of traversing from a first vertice to a second vertice. The usefulness of the invention in such a context will be apparent to one skilled in the art. Finally, aspects of the invention may be beneficial anywhere there is a breadth-first search of a beam search type being used. One skilled in the art will recognize that aspects of the invention may be advantageous in applications outside the beam search type too, e.g., fast search, depth-first searches, best-first searches, etc. Finally, one skilled in the art will appreciate that dynamic programming techniques and methods may be useful for various aspects of the invention.

Those of skill in the art will appreciate that, while many of the illustrative embodiment presented refer to building blocks, other embodiments may make use of other items, e.g., virtual modeling blocks, circuit design components and wires, etc. For example, various aspects of the invention may be implemented in a computer graphics system where virtual models of items may be generated. In that case, one skilled in the art may implement various aspects of the invention such that virtual modeling blocks are placed in a virtual grid region in a computer.

The use of the terms "a", "an" and "the" and similar referents in the context of describing the invention, especially in the context of the following claims, is to be construed to cover both the singular and the plural, unless otherwise indicated herein or clearly contradicted by context. The terms "comprising", "having", "including", and "containing"are to be construed as open-ended terms (meaning "including, but not limited to", ) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The term "between" is to be construed as an inclusive term, which includes the endpoints, unless otherwise noted. The use of any and all examples or exemplary language herein (e.g., "such as") is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations on those preferred embodiments may become apparent to those having ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The present invention has sometimes been described in terms of preferred and illustrative embodiments thereof. Numerous other embodiments, modifications and variations within the scope and spirit of the appended claims will occur to persons of ordinary skill in the art from a review of this disclosure.

What is claimed is:

1. One or more computer storage media including computer executable instructions embodied thereon that, when executed by one or more computing devices, cause the one or more computing devices to perform a method for generating instructions for filling a predetermined region, the method comprising:

receiving a dithered specification for the predetermined region;

generating a lattice corresponding to the dithered specification, wherein the lattice is populated with a set of vertices, a set of edges connecting the vertices, and cost function data associated with the edges on-the-fly;

recursively performing an overlapping divide-and-conquer beam search on the lattice to determine a path through a subset of vertices included in the lattice that minimizes an overall cost of filling the predetermined region, wherein the overall cost is calculated from the cost function data associated with the edges that connect the subset of vertices; and outputting instructions to a processor for the placement of building blocks in the predetermined region, the instructions generated using the determined path.

2. The one or more computer storage media of claim 1, wherein the predetermined region is 2 dimensional or 3 dimensional space.

3. The one or more computer storage media of claim 1, wherein the method further comprises generating the lattice such that each vertex represents a particular arrangement of building blocks.

4. The one or more computer storage media of claim 1, wherein the predetermined region further comprises a hollow interior.

5. The one or more computer storage media of claim 1, wherein the method further comprises converting non-visible building blocks to a less costly color.

6. The one or more computer storage media of claim 1, wherein the method further comprises indicating the building blocks are of different dimensions, colors, and costs.

7. The one or more computer storage media of claim 1, wherein the method further comprises storing the cost function data.

8. The one or more computer storage media of claim 7, wherein the cost function data further comprises the cost of a building block of a particular dimension.

9. The one or more computer storage media of claim 7, wherein the cost function data further comprises the cost of a building block of a particular color.

10. The one or more computer storage media of claim 7, wherein the cost function data further comprises the cost of placing a building block on the structural integrity of the lattice.

11. The one or more computer storage media of claim 10, wherein the method further comprises adjusting the cost function data based upon a weighting, the weighting indicating at least one of the percentage of the building block being over empty space, the number of unique pieces covered by the building block, or the variety of building blocks employed.

12. The one or more computer storage media of claim 1, wherein the method further comprises presenting the instructions as a visual representation of building block placement.

13. The one or more computer storage media of claim 12, wherein the method further comprises indicating on the visual representation building blocks from an adjacent layer with cross-hatched marking.

14. The one or more computer storage media of claim 1, wherein the method further comprises presenting the instructions as a textual explanation of building block placement.

15. A computer system for generating instructions for filling a predetermined three-dimensional region with building blocks, the computer system comprising at least one processor coupled to a computer-storage medium, the computer-storage medium having stored thereon a plurality of computer software components executable by the processor, the computer software components comprising:

an input component that receives a dithered specification for the three-dimensional predetermined region, wherein the dithered specification includes multiple layers;

a lattice construction component that generates a lattice for each layer included in the dithered specification, wherein the lattice for each layer is populated with cost function data on-the-fly;

a searching component that recursively performs an overlapping divide-and-conquer beam search on the lattice to determine a path through the lattice, wherein the path minimizes an overall cost of filling the three-dimensional predetermined region with building blocks; and an instruction component that outputs instructions for the placement of building blocks in the predetermined region, the instructions generated using the determined path.

16. The system of claim 15, further comprising an output device for presentation of the instructions, wherein the output device is one of a printer, plotter, automated CNC cutting machine, monitor, or other display device.

17. The system of claim 15, wherein the performing of the recursive beam search for the path concludes when a predetermined condition has been met.

18. The system of claim 15, wherein the dithered specification is obtained using constructive solid geometry (CSG) and a plane that moves through the constructive solid geometry to produce an image for each layer.

19. A computing device for filling a predetermined region with building blocks to create a mosaic, the computing device having at least one processor coupled to a computer-storage medium, the computer-storage medium having computer-usable instructions executable by the processor, the computing device comprising:

an input component that receives a dithered specification for the predetermined region;

a lattice construction component that generates a lattice corresponding to the dithered specification, wherein the lattice is populated, on-the-fly, with cost function data that varies as the size of the building varies;

a searching component that recursively performs an overlapping divide-and-conquer beam search on the lattice to determine a path through the lattice and that stops recursively performing the divide-and-conquer beam search after a fixed period of time expires, wherein the path minimizes an overall cost of filling the predetermined region with building blocks; and an instruction component that outputs instructions for the placement of building blocks in the predetermined region, the instructions generated using the determined path.

20. The system of claim 19, wherein the cost function data varies as the color of the building blocks varies.

* * * * *